United States Patent
Lin et al.

(10) Patent No.: US 11,218,917 B2
(45) Date of Patent: Jan. 4, 2022

(54) OPTIMIZED HANDOVERS OF WI-FI OFFLOAD SERVICE FROM A WI-FI NETWORK TO A CELLULAR NETWORK

(71) Applicant: Mediatek Inc., Hsin-Chu (TW)

(72) Inventors: Zong-Syun Lin, Hsinchu (TW); Yuhhua Hu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/229,683

(22) Filed: Dec. 21, 2018

(65) Prior Publication Data

US 2020/0205044 A1 Jun. 25, 2020

(51) Int. Cl.
*H04W 36/00* (2009.01)
*H04L 29/06* (2006.01)
*H04W 36/14* (2009.01)
*H04W 36/22* (2009.01)

(52) U.S. Cl.
CPC ..... *H04W 36/0038* (2013.01); *H04L 65/1016* (2013.01); *H04W 36/14* (2013.01); *H04W 36/22* (2013.01)

(58) Field of Classification Search
CPC ............. H04W 36/00; H04W 36/0038; H04W 36/0044; H04W 36/22; H04W 36/24; H04W 12/0808; H04W 12/03; H04W 12/0017; H04W 48/16; H04L 26/10; H04L 65/1016; H04L 65/102; H04L 12/66; H04L 63/164; G06Q 20/14
See application file for complete search history.

(56) References Cited

U.S. PATENT DOCUMENTS

| | | | |
|---|---|---|---|
| 8,792,453 B2* | 7/2014 | Bachmann | H04W 36/0038 370/331 |
| 2008/0095070 A1* | 4/2008 | Chan | H04W 12/03 370/254 |
| 2011/0216743 A1* | 9/2011 | Bachmann | H04L 63/164 370/331 |

(Continued)

FOREIGN PATENT DOCUMENTS

| | | | | |
|---|---|---|---|---|
| EP | 2166724 A1 * | 3/2010 | | H04W 12/088 |
| EP | 2166724 A1 | 3/2010 | | |

(Continued)

OTHER PUBLICATIONS

Alcatel-Lucent et al., 3GPP-BBF Interworking Mobility-Roaming-Nomadism, FMC100038, 3GPP-BBF FMC Workshop, 2010.

(Continued)

*Primary Examiner* — Ayaz R Sheikh
*Assistant Examiner* — Louis Samara
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The UE establishes a connection with a base station on a cell of the base station. The UE connects, through the cell, to a packet data network (PDN) gateway to access a PDN. The UE communicates with a security gateway via the PDN gateway and the PDN. The UE transfers, using a first source IP address, a secure tunnel between the UE and the security gateway initiated over a wireless access network to the PDN accessed through the cell.

20 Claims, 10 Drawing Sheets

(56) References Cited

U.S. PATENT DOCUMENTS

| | | | | |
|---|---|---|---|---|
| 2011/0261787 A1* | 10/2011 | Bachmann | .......... | H04W 12/037 |
| | | | | 370/331 |
| 2012/0033610 A1* | 2/2012 | Ring | ...................... | G06Q 20/14 |
| | | | | 370/328 |
| 2015/0350983 A1* | 12/2015 | Kwok | ................. | H04L 65/1016 |
| | | | | 370/331 |
| 2016/0295386 A1* | 10/2016 | Faccin | .................. | H04W 4/023 |
| 2017/0325273 A1* | 11/2017 | Chaugule | .......... | H04W 36/0022 |
| 2018/0152871 A1* | 5/2018 | Vanapalli | .............. | H04W 12/50 |
| 2019/0239147 A1* | 8/2019 | Chun | .................... | H04W 48/16 |

FOREIGN PATENT DOCUMENTS

| | | | | |
|---|---|---|---|---|
| EP | 2194686 A1 * | 6/2010 | ............ | H04W 12/80 |
| EP | 2194686 A1 | 6/2010 | | |

OTHER PUBLICATIONS

International Search Report, dated Sep. 24, 2019.
Taiwan Patent Office, 108145284, "Office Action", dated Oct. 27, 2020, Taiwan.

* cited by examiner

OPTIMIZED HANDOVERS OF WI-FI OFFLOAD SERVICE FROM A WI-FI NETWORK TO A CELLULAR NETWORK

BACKGROUND

Field

The present disclosure relates generally to mobile communication systems, and more particularly, to user equipment (UE) that supports optimized handovers from a Wi-Fi (Wireless Fidelity) network to a cellular network in wireless communication systems.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE connects to a security gateway via a packet data network (PDN) gateway. The UE further establishes a secure tunnel between the UE and the security gateway using a first source IP address.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
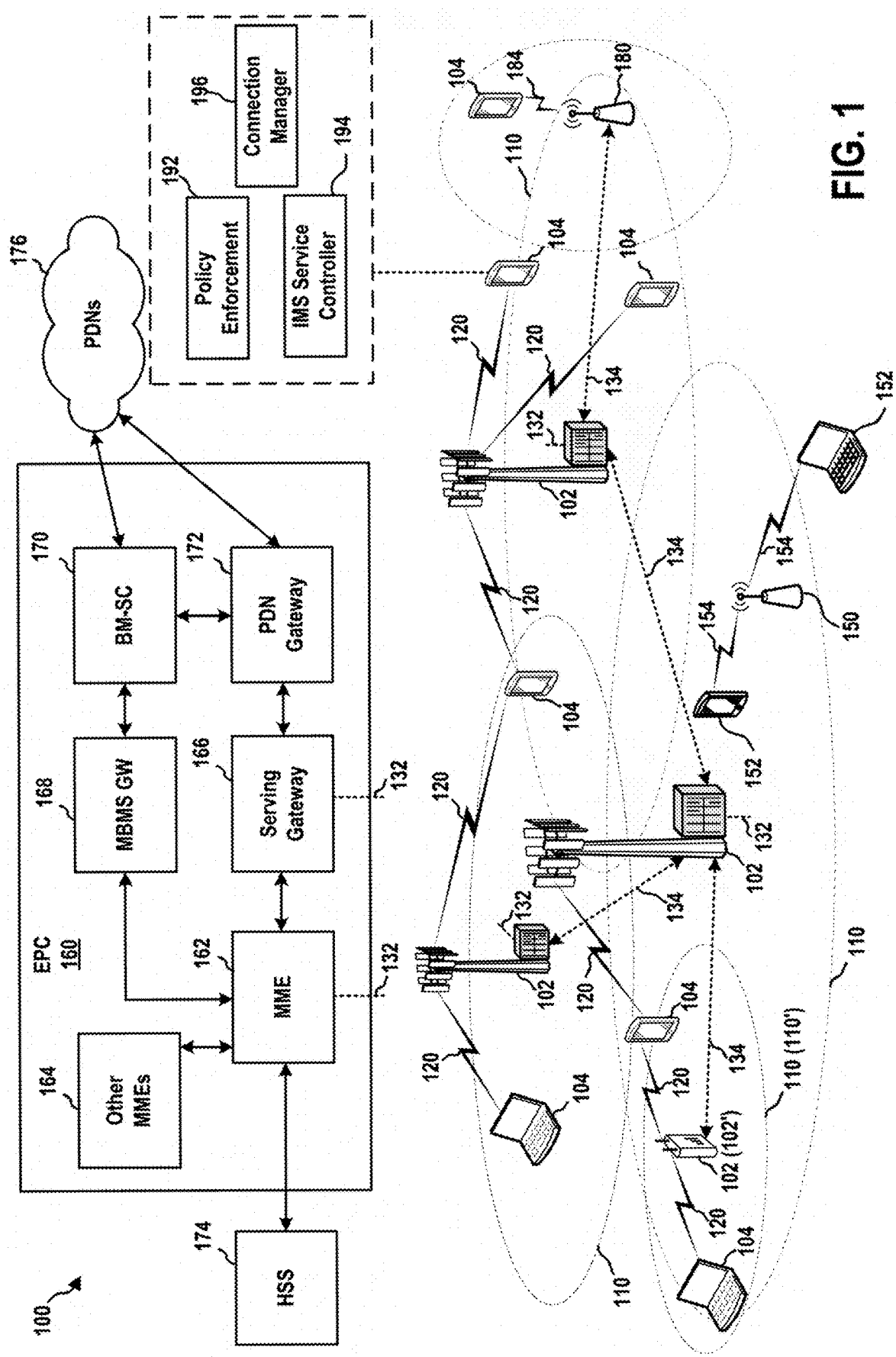
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, a policy enforcement component 192 at the UE 104 is pre-configured to perform packet encryption and decryption as well as header generation on tunnel mode packets requiring security. It also passes or drops packets and may be configured to perform additional functionality such as Static Network Address Translation (NAT) or fragmentation.

In certain aspects, an IMS service controller 194 at the UE 104 is pre-configured to perform IMS service registration. Additionally, if the UE 104 is a multi-SIM device, the IMS service controller 194 is pre-configured to separately manage IMS service registration for each SIM. In various aspects, each SIM may be capable of communicating with different radio access technologies (RAT)s or the same RAT, depending on detected radio channel conditions.

In certain aspects, a connection manager component 196 at the UE 104 is pre-configured to enable communication functionality with a cellular radio access network (2G, 3G, 4G, 5G, and the like). For example, the connection manager component 196 may be configured to support a multi-homing protocol. In certain configurations, the multi-homing protocol is MOBIKE protocol.

Figure 2:
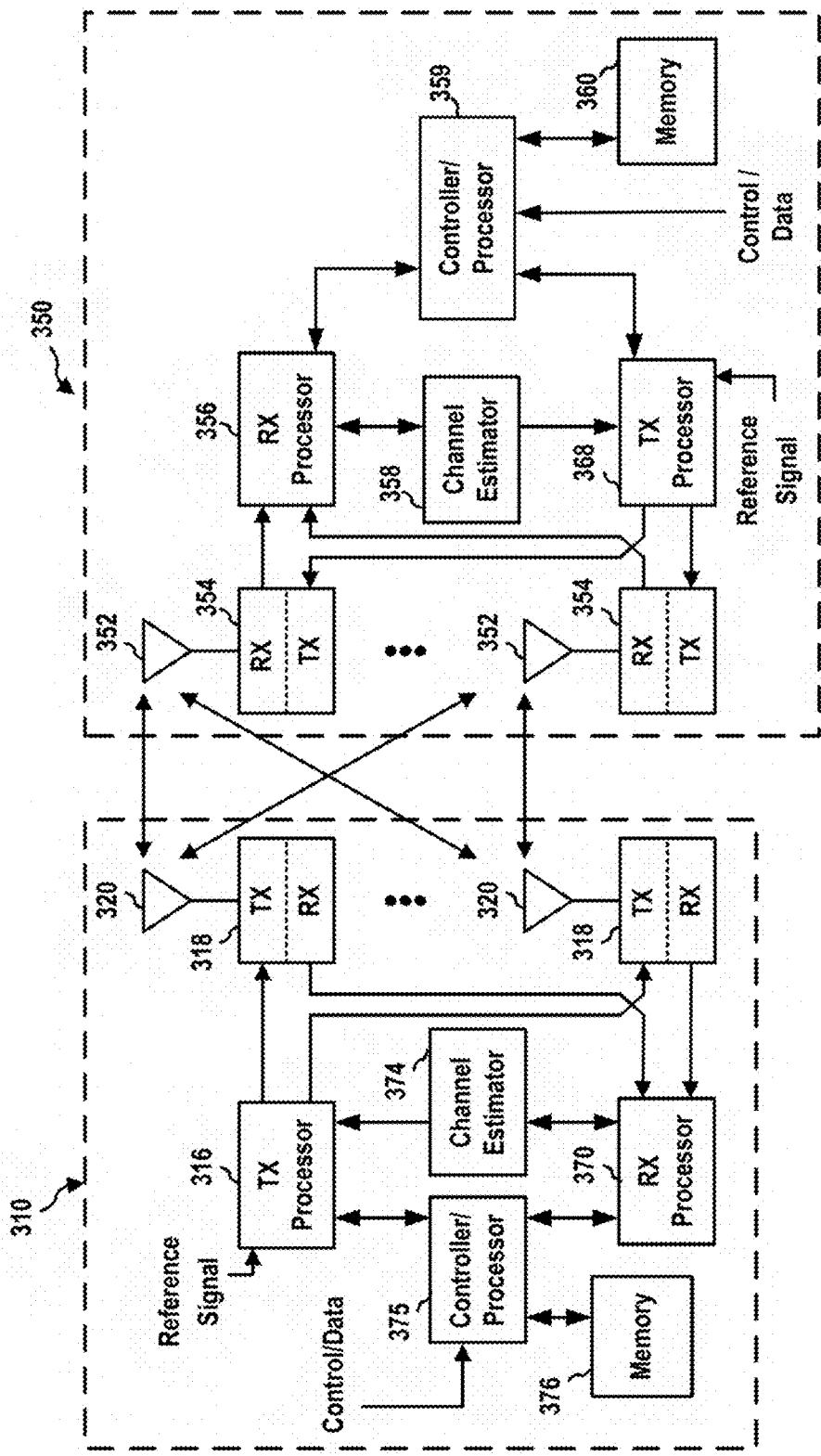
FIG. 2 is a diagram illustrating a base station in communication with a UE in an access network.

FIG. 2 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission. The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Recently there has been a propagation of calls using Voice over Long Term Evolution (VOLTE) standards. That, combined with the continued increase in cellular network telecommunications traffic, has incentivized some service providers to offer calling through Wi-Fi connections in accordance with the various IEEE 802.11 standards. Such Wi-Fi offloading, as it is called, enables telecommunications calls and data from a UE to be offloaded from the cellular network to the internet for transport from the UE to the termination destination point and vice versa. Such Wi-Fi networks may be either generally secure, operator controlled networks, known as trusted networks, or generally unsecured, publicly accessible Wi-Fi networks through public hotspots and the like, known as untrusted networks.

Embodiments are disclosed below that provide call continuity between trusted/untrusted wireless access networks (e.g., Wi-Fi networks) and cellular networks, such as LTE network, for example. More specifically, the disclosed system governs the movement of UEs between the Wi-Fi and cellular networks with an IMS call in progress.

The IMS is technology that merges the internet with the cellular world. It makes internet technology such as the web, email, instant messaging, user presence, video conferencing and so forth available in nearly any location. The IMS is a key element in 3G (and beyond) architecture that makes it possible to provide ubiquitous access to all services that the internet provides. For example, it enables one to access their favorite web pages, read their email, watch a movie or take part in the video conference wherever one is by simply using a mobile device and accessing the desired services.

Generally, the IMS combines the latest trends in packet switch technology and circuit switch technology to make a mobile internet available. It also creates a common platform to develop various multimedia services and creates a mechanism to boost margins for service providers due to extra usage of mobile packet switch networks. There are various protocols used in the IMS which include the session control protocol, and a SIP as well as other protocols known to those of skill in the art that are utilized for providing the multimedia services. The IMS architecture is a collection of functions linked by standardized interfaces. Most vendors follow the IMS architecture closely and implement each function in a single node although other nodes may be used.

Among many other services provided by Wi-Fi networks is MMS (Multimedia Message Services) service. MMS message refers to a multimedia message, which contains text, audio, video various other multimedia content sent via mobile devices in a mobile device network. MMS may be a store-and-forward method of transmitting graphics, video clips, sound files and short text messages over wireless networks using the WAP protocol. Carriers deploy special servers, dubbed MMS Centers (MMSCs) to implement the offerings on their systems. MMS also supports e-mail addressing providing that a device may send e-mails directly to an e-mail address. MMS may be used for communication between scanners and scanning mobile devices such as Point Of Transaction (POT) scanners, mobile devices, PDTs, PDAs, etc.

The embodiments disclosed below provide communication traffic continuity between wireless access networks, such as Wi-Fi networks, and cellular networks by employing a security gateway, such as an evolved Packet Data Gateway (ePDG) or a Non-3GPP Inter-Working Function (N3IWF). The security gateway plays a role of a security node for an unreliable non-3GPP network (e.g., a Wi-Fi hotspot). In other words, the security gateway is located in the 3GPP core network which provides the 3GPP PS based service to WLAN UEs. In various configurations, UEs may establish a secure tunnel with a security gateway over untrusted WLAN access to get operator's service such as IMS or MMS. Wireless cellular network service providers are adding WLAN connectivity to provide access to cellular services through WLAN networks for cellular service subscribers to supplement access via cellular networks. In certain configurations, the UE provides an indication of the services handover in one or more messages sent to the security gateway when seeking to transfer an existing IMS communication session from an untrusted non-cellular wireless access network to a cellular wireless network. Advantageously, the UE can get access to IMS services via the established secure tunnel even in a roaming network, depending on wireless cellular network service providers' policies.

In some circumstances, access to particular "cellular" services by a subscriber using a UE may vary based on whether the UE is connected through an access network portion of a cellular wireless network, through a trusted non-cellular wireless access network, or through an untrusted non-cellular wireless access network. Each WLAN can provide a different level or different type of security than provided by a cellular wireless network. In addition, for regulatory or business reasons, a wireless service provider may seek to allow or deny access to one or more particular cellular services based on one or more factors including a location of a UE, a type of wireless network through which a connection is realized, or a type of connection that is capable of being established.

The terms "handset", "mobile device," "UE (user equipment)" and "user device" used herein are interchangeable and refer to a mobile communication device, e.g., a smartphone, used by a user for wireless communication. The term "ePDG" used herein denotes evolved package data gateway for Internet Protocol Security (IPSec) tunneling from a user device through an untrusted non-3GPP access network such as, for example, a Wi-Fi network or any wireless access network utilizing unlicensed spectrum. The term "Wi-Fi calling" used herein denotes voice service to be carried through the IPSec tunnel. The term "video calling" used herein denotes IMS-based full duplex voice and simplex/full-duplex video media with tight synchronization between the constituent streams.

Figure 3:
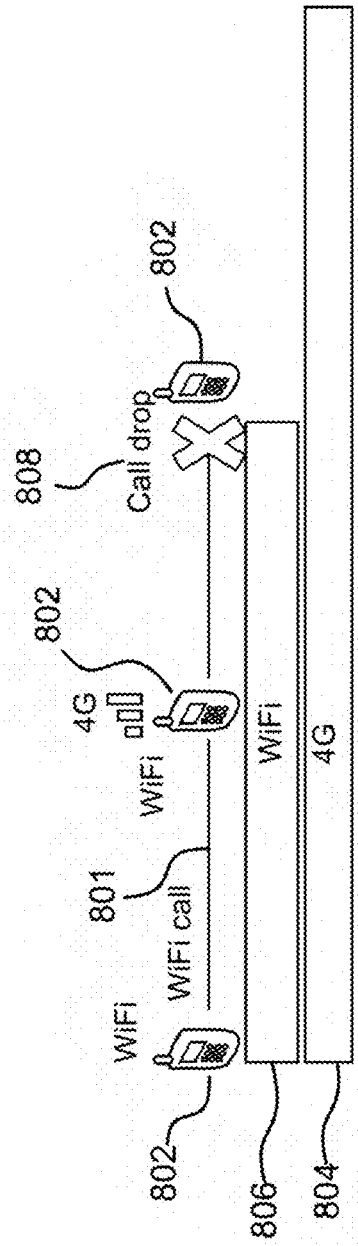
FIG. 3 is a diagram showing an example of a dropped IP Multimedia Subsystem (IMS) call over a wireless access network.

FIG. 3 is a diagram showing an example of a dropped IMS call over a Wi-Fi network. FIG. 3 illustrates a case where phone calls and/or data from a UE 802 e.g., a smart phone, is offloaded from the serving cellular network (e.g., 4G network) 804 to a Wi-Fi network for transport from the UE 802 to the termination destination point and vice versa. More particularly, upon sending a message requesting IMS registration, the UE 802 located in a serving cellular network 804 may determine that the IMS service features may not be available to the UE 802. The IMS makes use of the SIP to set up and control calls or sessions between user terminals (or user terminals and application servers). The Session Description Protocol (SDP), carried by SIP signaling, is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP). Although, the serving cellular network 804 may support IMS clients and UE registration procedures, sometimes the UE 802 may not be able to get IMS service due to some kind of issue within the cellular network 804. In some cases, the UE 802 may use a dual network mode of operation that includes data connections via the serving cellular network 804 (e.g., a 4G LTE/LTE-A network) and voice connections via a legacy 3G or 2G network. In other cases, the performance metrics may indicate that IMS voice connections may be unstable, such as when a reference signal received power (RSRP) falls below a threshold level but remains above a reselection/handover threshold level. Yet in other cases the UE 802 may not be able to establish the requested IMS voice connection simply because the serving cellular network 804 does not support IMS voice features in this particular region.

Currently, IMS networks are frequently deployed as parallel independent networks and frequently there may be no IMS roaming agreements between different cellular network operators. Thus, at least in some cases, even if roaming services are enabled by the UE device 802 and even if the cellular network operator's roaming revenue is contributed by voice calls based revenue and less revenue contribution is due to data services, the UE device 802 may still not be able to use IMS voice services when on roaming.

FIG. 3 further illustrates an example, where an offloaded media session 801, such as IMS voice over packet switched (VoPS) session, established by the UE device 802 over a wireless access network (e.g., Wi-Fi network) is dropped 808 due to loss of wireless access network coverage, when the UE device 802 is located in an area which does not support IMS services for one of the above described reasons. In some examples, the established media session 801 is not limited to voice, but may include one or more other forms of media (e.g., video). In other words, when the quality degrades, the media session 801 may be transferred to a Wi-Fi connection 806, assuming the Wi-Fi connection 806 is available. However, once the Wi-Fi connection is no longer available, the media session 801 may be dropped if the reverse transfer back to the serving cellular network 804 (either 4G network or, for example, roaming 2G/3G network) cannot take place, due to unavailable IMS features of the serving cellular network connection. Similarly, if the media session 801 is a 4G IMS call and once the 4G connection is no longer available, the IMS call will be dropped if the call is transferred to a CDMA network, for example.

Figure 4A:
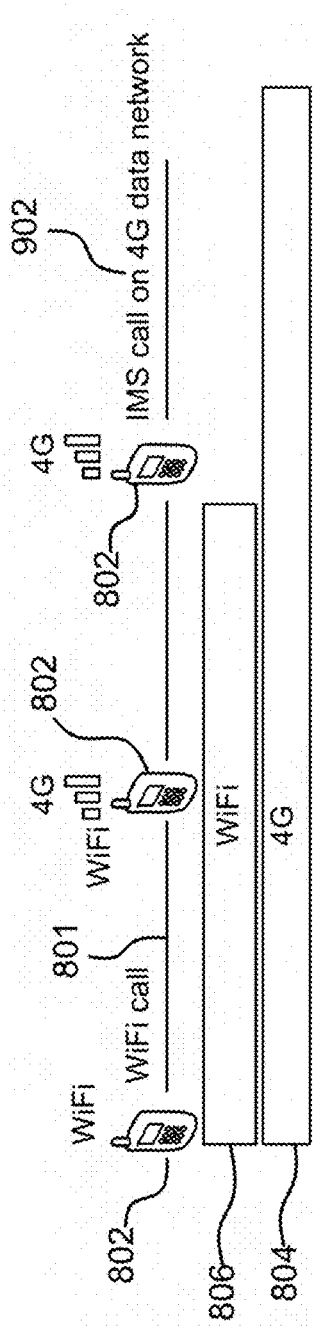
FIGS. 4A and 4B illustrate exemplary handover of an IMS call from a wireless access network to a cellular network and exemplary handover of a dropped IMS call from a 4G network to another type cellular network, respectively.
Figure 4B:
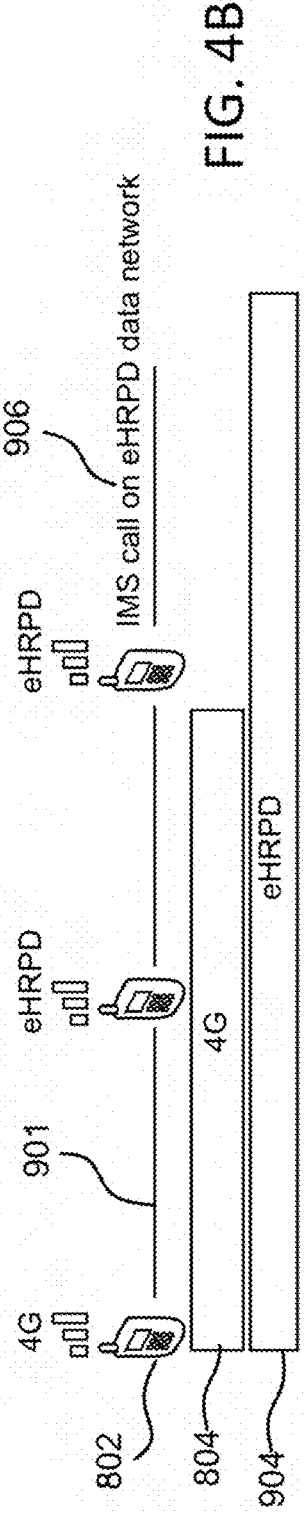

FIGS. 4A and 4B illustrate exemplary handover of an IMS call from a wireless access network to a cellular network and exemplary handover of a dropped IMS call from a 4G network to another type cellular network, respectively. As noted above, expanding traffic on mobile networks has increased the need for mobile data offloading, wherein a mobile device may access carrier-provided services originally targeted for cellular networks over an alternative wireless access network, such as Wi-Fi, one type of WLAN. One form of mobile data offloading uses the I-WLAN (Interworking Wireless LAN) or SMOG (S2b Mobility based on GTP) architecture to supply carrier-provided services to the mobile device over Wi-Fi. These carrier-provided services may include VVM (Visual VoiceMail), MMS (Multimedia Messaging Service), SMS (Short Messaging Service) and IMS.

FIG. 4A, similarly to FIG. 3, illustrates a UE device 802, which may also be referred to as a mobile device, that may communicate using different radio access technologies (e.g., different cellular RATs and/or WLANs) at different times. In various situations, the UE 802 and/or the network may initiate handover between different wireless technologies based on various criteria. For example, consider a situation in which the UE 802 is being used for a media session (e.g. VoLTE IMS phone call) outside a residence using the 4G network connection (e.g., LTE connection) of the serving cellular network 804 and the user steps inside. At this point, the signal strength of the LTE connection may drop (e.g., because of the roof of the residence) and the signal strength of the Wi-Fi connection 806 may increase (e.g., because the user is closer to a Wi-Fi access point). In response, the UE 802 may initiate a handover from the LTE connection of the serving cellular network 804 to the Wi-Fi connection 806. If the signal strength of the Wi-Fi connection 806, however, becomes weak or if the signal gets lost completely, this may result in the media session 801 being dropped, as shown in FIG. 3. Advantageously, embodiments of the present invention contemplate a method of performing a handover from the Wi-Fi network connection 806 to another cellular serving cellular network 804 to continue the IMS call 902 using another serving cellular network 804, even if another serving cellular network 804 does not support IMS voice calls.

Referring now to FIG. 4B, the UE device 802 performs, for example, a voice call or a video call 901 over an IP packet-switched serving cellular network 804 using IMS framework. In some configurations, the UE device 802 may be calling using Subscriber Identity Module (SIM) IMS. The UE device 802 is a multimode device and may pre-register with the evolved high rate packet data (eHRPD) based system 904 to support optimized handover between the serving cellular network 804 and eHRPD systems 904. As used herein, optimized handover may refer to a handover from one technology with the radio and IP session context created on the target RAT prior to transitioning to the target RAT. Further, as used herein eHRPD direct mode operations refer to an operational mode in which the UE 802 is directly operating on the eHRPD radio interface 906 (e.g., through HRPD base station).

Figure 5:
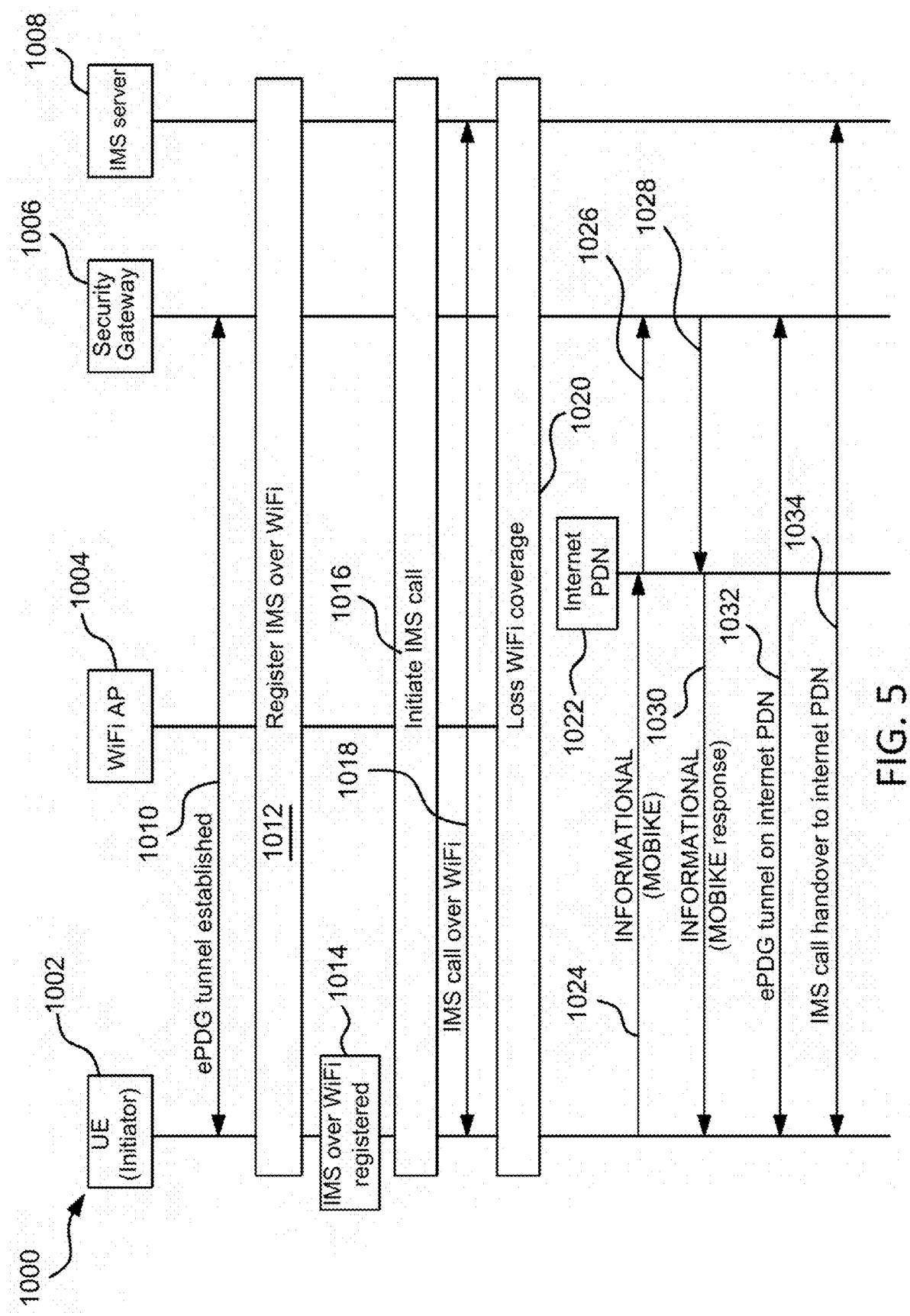
FIG. 5 is a sequence diagram illustrating an example of facilitated handover of IMS call from a wireless access network to a cellular network, when wireless access network service is no longer available.

FIG. 5 is a sequence diagram illustrating an example of facilitated handover of IMS call from a wireless access network to a cellular network, when wireless access network service is no longer available. Interoperability between cellular networks, such as, for example, an LTE network and wireless access networks, such as, for example, Wi-Fi networks has been the center of significant work in the 3GPP. It is often desirable to provide a user the option to use a Wi-Fi network as a data connection as an alternative to the cellular connection. Furthermore, as noted above, in cellular networks, and in particular LTE networks, VoIP (e.g., VoLTE) is becoming the preferred way of establishing voice communication using mobile handsets. An IMS server 1008 may be used in the core network of the cellular network as an IP layer connection point for routing the voice data. There are multiple ways of establishing connection to the IMS server 1008 from the UE 1002 deployed in a dual mode, one of which is using WLAN radio, which is associated with a public or private Access Point (AP) 1004, to establish communication with the IMS server 1008, e.g., a secure tunnel 1010 to a security gateway 1006, such as, for example, the ePDG/N3IWF node. This is possible because the IMS server 1008 resides on an IP based network that may be accessed through any Internet connected device. Authentication is handled by the carrier and a secure connection may be established between the UE device 1002 and the IMS server 1008. This creates alternative paths for the UE device 1002 to reach to the IMS server 1008 and receive service (e.g., for VoLTE).

As shown in FIG. 5, the UE device 1002 may communicate with the AP 1004, which in this embodiment may be a WLAN access point, such as Wi-Fi access point 1004. The Wi-Fi access point 1004 may couple through a network, such as the Internet, to the security gateway 1006. The security gateway 1006 is utilized in the network function of 4G mobile core networks, known as the EPC mentioned above, as well as future mobile networks, such as 5G networks. The security gateway 1006 may act as an interface between the EPC and non-3GPP networks that may use secure access, such as Wi-Fi and femtocell access networks. In one embodiment, the UE device 1002 performs authentication with the security gateway 1006 using MOBIKE (Mobility and Multihoming) protocol based on IKE (IPsec Key Exchange). IPSec defines a set of specifications for cryptographic encryption and authentication. IPSec also supports several algorithms for key exchange, including an IKE algorithm for establishing keys for secure sessions established between applications.

As related to the exemplary embodiments, a voice call or a video call may be performed over the Wi-Fi network by registering 1012 with the IMS server 1008. While connected to the Wi-Fi network, the UE 1002 may specifically be configured to perform IMS over Wi-Fi registration 1014. Once registered for IMS over Wi-Fi, the UE device 1002 may initiate 1016 an IMS call to obtain IMS voice or video service. After the connection to the IMS server 1008 over a Wi-Fi network is established, the UE 1002 performs 1018 an IMS call over the Wi-Fi network when the Wi-Fi network is available. Developed in different versions (i.e. 802.11a/b/g/n) Wi-Fi offers coverage up to hundreds of meters with a theoretical throughput up to at least about 50 Mbps.

However, as soon as the UE device 1002 leaves the coverage of this Wi-Fi AP 1004, an interruption occurs, causing the loss 1020 of the Wi-Fi network connection. Therefore, handover techniques for maintaining seamless connections during mobility are proposed so that, while moving, users of the UE device 1002 do not experience substantial interruption in their ongoing IMS communications.

One object of the present invention is to propose a method and algorithm to detect Wi-Fi connectivity loss between the UE device 1002 and a Wi-Fi infrastructure in order to make all necessary actions to move existing network streams to another network that proposes a better connectivity.

A typical 3GPP mobile network includes GPRS core circuit-switched and packet-switched networks. The core packet-switched network for the mobile network provides access to one or more packet data networks (PDNs), which may include, for example, the Internet, an enterprise intranet, and a service provider's private network. Various PDNs provide a variety of packet-based services to mobile devices, such as bulk data delivery, VoIP, Internet protocol television (IPTV), and the SMS.

In some configurations, the disclosed method includes the steps of detecting Wi-Fi connectivity loss and providing a path for the UE to a data network. The below examples illustrate application of the techniques to PDN gateways and PDNs in an LTE network. Nonetheless, the techniques described here can be similarly applied to protocol data unit (PDU) session anchors and data networks (DNs) in a 5G NR network. In one configuration, in response to detecting loss 1020 of Wi-Fi coverage, the UE performs a handover from a Wi-Fi network to a cellular network using the Internet PDN gateway 1022. More specifically, the UE 1002 sends a MOBIKE informational request 1024 to the Internet PDN gateway 1022 to update the IPsec Security Association (SA) with the security gateway 1006. Because MOBIKE is used, it is not necessary to create completely new IKE and IPsec SA. The Internet PDN gateway 1022 forwards 1026 the MOBIKE informational request to the security gateway 1006. After updating corresponding SA, the security gateway 1006 sends a response 1028 informing the Internet PDN gateway 1022 that the SA update was successful. In turn, the Internet PDN gateway 1022 informs the UE 1002 that the SA update was successful by sending a MOBIKE informational response 1030. In some configurations, in response to receiving the MOBIKE informational response 1030, the UE device 1002 may transfer to the Internet PDN 1022 the IPsec tunnel 1010, which becomes a PDN IPsec tunnel 1032 connecting the UE device 1002 with the security gateway 1006. The UE device 1002 may associate all IMS traffic with the established PDN IPSec tunnel 1032. In some configurations, the UE 1002 may be configured to provide a seamless transition 1034 of a call (e.g., a voice call or a video call) through the IMS PDN IPSec tunnel 1032 from Wi-Fi network to a cellular 3GPP access network, such as LTE, for example.

Figure 6A:
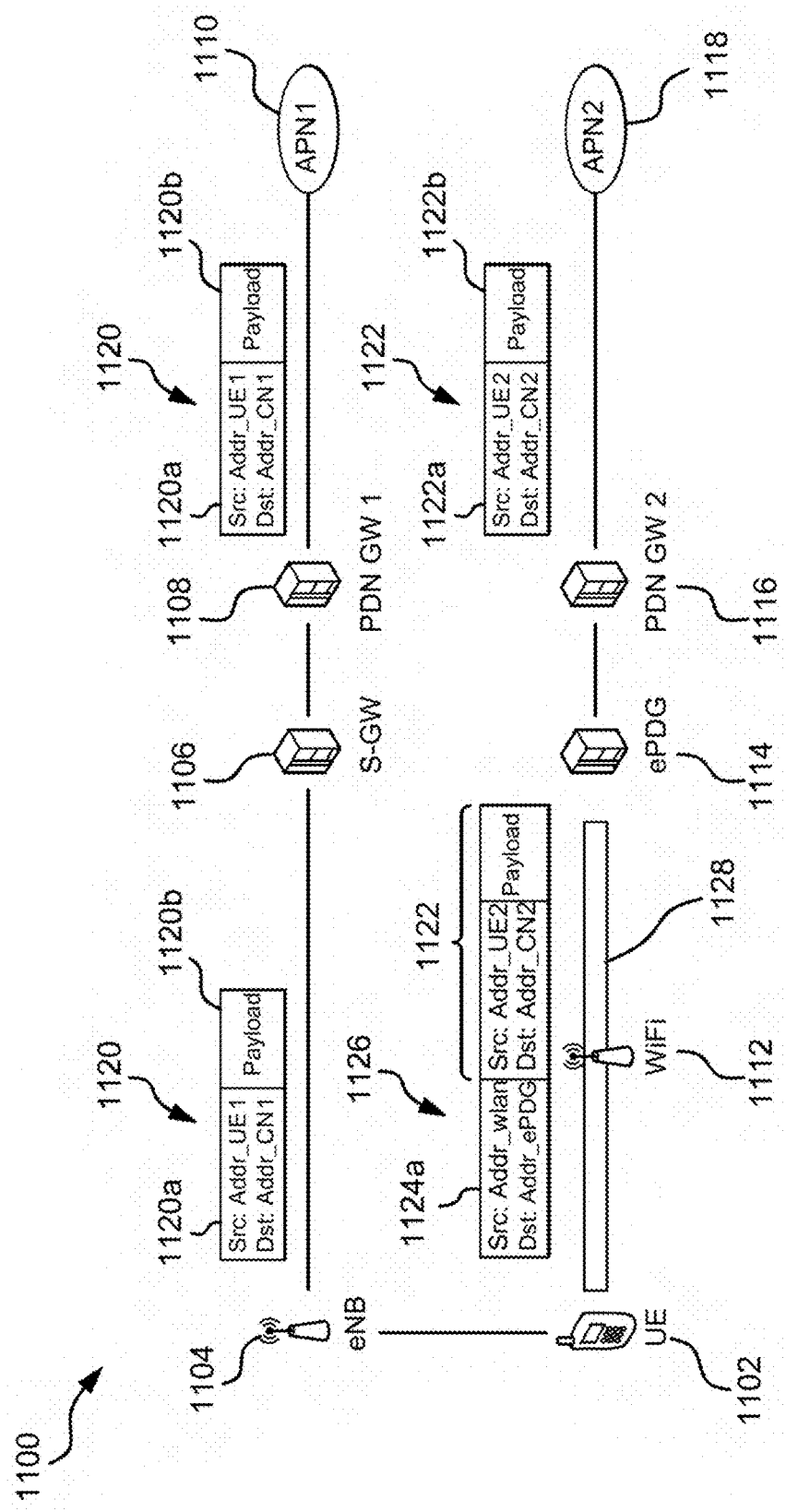
FIG. 6A is a diagram illustrating establishment of a tunnel with a security gateway over a wireless access network that is used for performing an IMS call, when wireless access network service is available.

FIG. 6A is a diagram illustrating establishment of a tunnel with a security gateway over a wireless access network that is used for performing an IMS call, when wireless access network service is available. In one embodiment, a UE 1102 may be configured to dynamically switch its IMS service through available radio carriers based on current network conditions. Furthermore, as shown in FIG. 6A, the UE device 1102 may be configured to receive network services via multiple access point names (APNs.) 1110, 1118.

An APN indicates the type of network service to be provided to a UE device. An APN can be conceptually considered a service name. For example, different APNs may be associated with different home networks that provide different services to a UE device. Different applications running on a UE device can use different home networks (i.e., APNs) to receive services. Different APNs 1110, 1118 can use different IP addresses to reach the same UE device 1102 because different APNs 1110, 1118 may use different IP PDNs for delivering services to the UE device 1102.

In a wireless LAN, a UE device can receive service only from a single APN because a mobile device's wireless LAN interface can only be assigned a single IP address. The Dynamic Host Configuration Protocol (DHCP), which is used to assign IP addresses to UE devices over wireless LAN networks, lacks semantics for assigning multiple IP addresses to the wireless LAN interface of the UE device.

FIG. 6A illustrates two different PDN connections to two different APNs. A first PDN connection to a first APN 1110 includes a base station 1104, a serving gateway (S-GW) 1106, and a first PDN gateway 1108. The UE 1102 and the base station 1104 may be components of E-UTRAN, which is the air interface of the LTE/LTE-A systems. The serving gateway 1106 and the first PDN gateway 1108 may be components of an EPC, which is the core network architecture of LTE/LTE-A systems. The first APN 1110 may be an addressable node on a PDN communicatively coupled with the first PDN gateway 1108.

A second PDN connection to a second APN 1118 includes a Wi-Fi access point 1112 that is ePDG optimized (known to be ePDG connection compatible), an ePDG 1114 and a second PDN gateway 1116. The UE 1102 and the Wi-Fi access point 1112 may be components of a WLAN. The ePDG 1114 and the second PDN gateway 1116 may be components of the EPC. The second APN 1118 may be an addressable IMS core node (such as the IMS server 1008 shown in FIG. 5) that provides IMS communication services to the UE 1102 and that is communicatively coupled with the second PDN gateway 1116.

In the illustrated scenario, when a 4G signal is weak and Wi-Fi signal is strong, the UE device 1102 may employ the second PDN connection to perform an IMS call by establishing an ePDG tunnel 1128, as described above in conjunction with FIG. 5.

Tunneling is a process in which a packet being transmitted between remote hosts may be encapsulated as a payload within another packet for transmission between two trusted gateways or other endpoints of the tunnel. An original packet is sent from the originating host to the trusted device, where it is enclosed as the payload of a new IP packet, and a new IP header is prepended to it with its destination field containing the IP address of the device at the end of the tunnel. Upon arrival at the end of the tunnel, the new "outer" header is stripped away, and the original packet may then be forwarded to a LAN or further processed, as appropriate. By using a tunnel, it is possible to circumvent conventional routing mechanisms for the encapsulated packet during transit, while it is in the tunnel.

FIG. 6A further illustrates IP packets transmitted through respective PDN connections. Starting with the second PDN connection, packet 1126 illustrates a packet that may be utilized for IMS call transmission. The original packet includes a packet header 1122a and a payload 1122b. The packet header 1122a includes a source field (source IP address, e.g., Addr_UE2) of the UE device 1102 and a destination field (e.g., IP address of IMS call target). However, since the UE device 1102 established the tunnel 1128 over the Wi-Fi network, the original packet 1122 is enclosed as a payload of a new, so called tunnel mode packet 1126. The tunnel mode packet 1126 is created by prepending a new IP header 1124 to the original packet 1122 with a destination field of the new IP header 1124 containing the IP address of the ePDG 1114 and a source field containing a local WLAN IP address of the UE device 1102. Upon arrival of the tunnel mode packet 1126 at the ePDG 1114, the ePDG 1114 strips away the "outer" header 1124 and forwards the original packet 1122 to the second PDN gateway 1116, which in turn forwards it to the second APN 1118.

Referring now to the first PDN connection, a packet 1120 transmitted over the first PDN connection also includes a packet header 1120a and a payload 1120b. This packet travels from the base station 1104 to the first APN 1110. Of note, a source field of the header 1120a uses a different IP address of the UE device 1102, as compared to the packet header 1122a. Again, different APNs 1110, 1118 can use different IP addresses to reach the same UE device 1102.

Figure 6B:
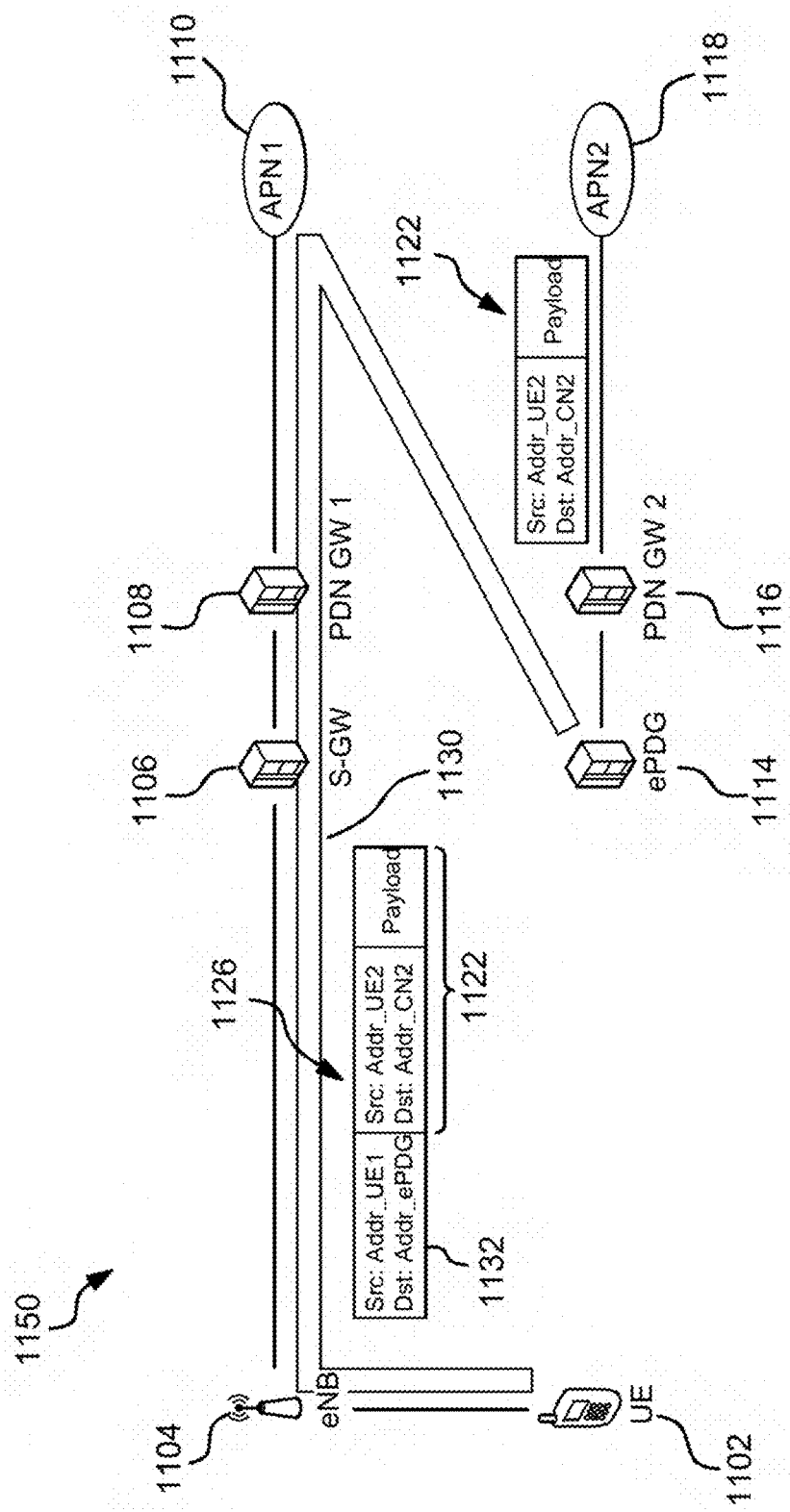
FIG. 6B is a diagram illustrating transferring a tunnel with a security gateway initiated over a wireless access network to a cellular service network.

FIG. 6B is a diagram illustrating transferring the security tunnel initiated over the wireless access network provided by the Wi-Fi access point 1112 to a cellular service network when the wireless access network service is no longer available. More specifically, when wireless access network to cellular network handover is needed (e.g., Wi-Fi signal is too weak and 4G signal is strong), the UE 1102 performs the handover from the Wi-Fi AP 1112 to a cellular network, for example, 3GPP network. More specifically, the UE 1102 transfers to the cellular network the tunnel 1128, which becomes a tunnel 1130 connected with the ePDG 1114 via the first APN 1110. In this case, the original packet 1122 is still enclosed as a payload of the packet 1126. However, in this case, a different header 1132 is prepended to it to form a tunnel mode packet. While the destination field of the header 1132 of the tunnel mode packet still includes the IP address of the ePDG 1114, the source field contains the IP address of the UE device 1102 that is associated with the first APN 1110. In other words, in this illustrative embodiment, the IP addresses associated with the same UE device 1102 are different in the original packet 1122 and the prepended header 1132. Just like in FIG. 6A, after the tunnel mode packet reaches the end of the tunnel 1130 at the ePDG 1114, the ePDG 1114 removes the prepended header 1132 and forwards the original packet 1122 to the second APN 1118.

In other words, after the tunnel 1126 is transferred to the cellular network and becomes the tunnel 1130, the UE 1102 transfers the IMS call from the Wi-Fi network to the cellular network.

Figure 7:
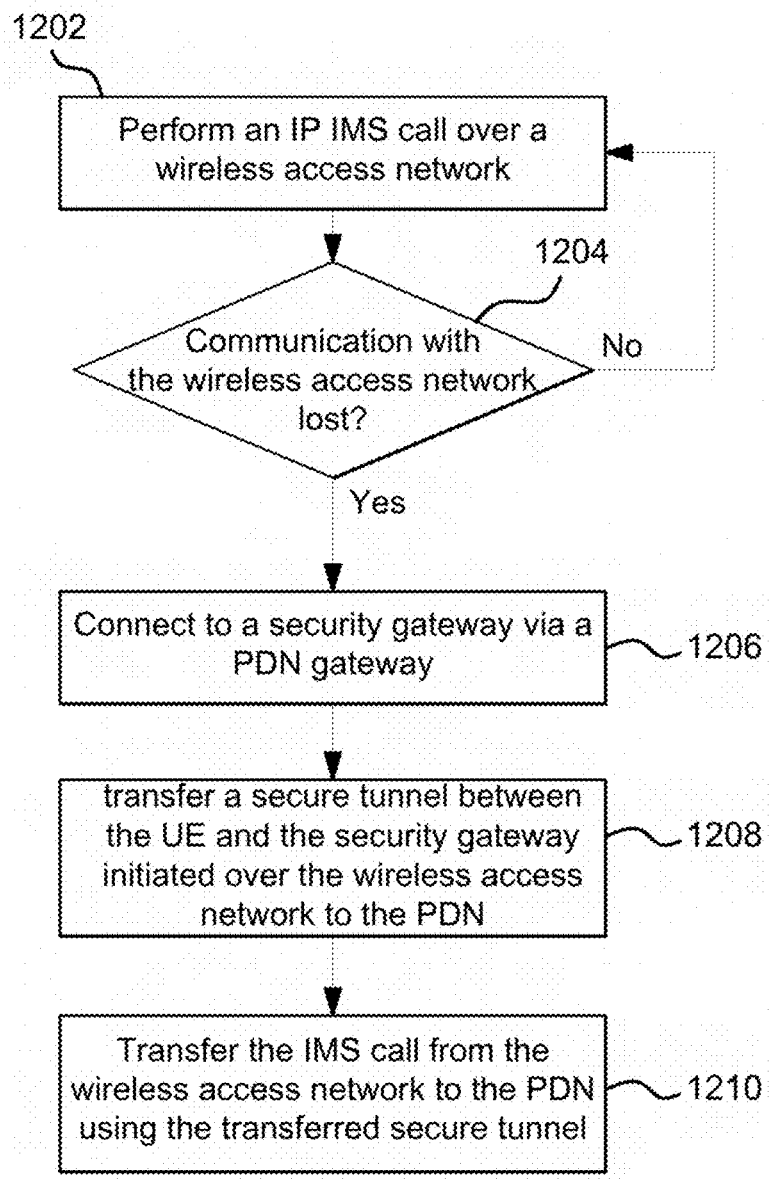
FIG. 7 is a flow chart of a method (process) for transferring a secure tunnel between a UE and a security gateway initiated over the wireless access network to a cellular network.

FIG. 7 is a flow chart of a method (process) for transferring a secure tunnel between a UE and a security gateway initiated over a wireless access network to a cellular network. At operation 1202, the UE (e.g., UE 1002 shown in FIG. 5) performs an IP IMS call over a wireless access network. As shown in FIG. 5, while connected to the wireless access network, the UE 1002 may specifically be configured to perform IMS over Wi-Fi registration 1012. Once registered, the UE device 1002 deployed may initiate 1016 an IMS call to obtain IMS voice, video or other IMS service. After establishment of the connection to the IMS server 1008 over a wireless access network, the UE 1002 performs 1018 an IMS call over the wireless access network when the wireless access network is available.

At operation 1204, the UE 1002 periodically determines if communication with the wireless access network is lost. For example, if the UE 1002 is not within a wireless access network range, then communication with the wireless access network can be lost. Even if another network (e.g., PDN) is available when wireless connectivity to a wireless access network is lost due to the movement of the UE 1002, the other available network will be inaccessible to the UE 1002 without an appropriate network configuration to latch onto the available network.

Figure 8:
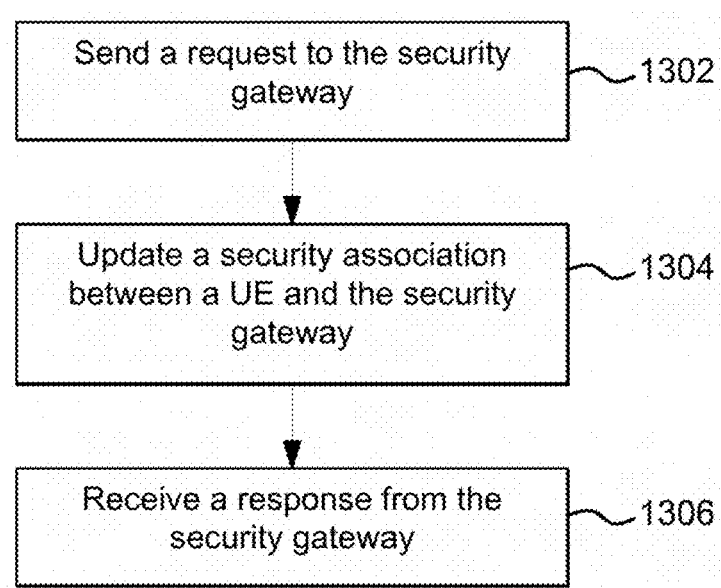
FIG. 8 is a flow chart of a method (process) for connecting the UE to the security gateway.

At operation 1206, in response to determining that communication with the wireless access network is lost (operation 1204, "yes" branch), the UE 1002 connects to a security gateway 1006 (e.g., the ePDG/N3IWF) via the PDN gateway 1022. More specifically, as shown in FIG. 8, the UE 1002 sends a request to the Internet PDN gateway 1022 to update the security association with the security gateway 1006. Furthermore, the connection operation 1206 involves the security gateway 1006 sending a response 1028 informing the Internet PDN gateway 1022 that the security association update was successful.

Next, at operation 1208, the UE 1002 transfers a secure tunnel between the UE 1002 and the security gateway 1006 initiated over the wireless access network to the Internet PDN 1022. In some configurations, the secure tunnel may include an IMS PDN IPsec tunnel 1032 (shown in FIG. 5) connecting the UE device 1002 with the security gateway 1006. Further, at operation 1208, the UE 1002 may associate all IMS traffic with the secure tunnel 1032.

At operation 1210, the UE 1002 provides the transition 1034 of a call through the transferred secure tunnel from the wireless access network to the PDN. In various configurations, the transferred call may be a voice call or a video call. In certain configurations, the call may be transferred from a Wi-Fi network to a 3GPP access network, such as LTE, for example.

FIG. 8 is a flow chart of a method (process) for connecting the UE to the security gateway.

At operation 1302, the UE 1002 attempts to connect to the security gateway by sending a corresponding request. More specifically, the UE 1002 sends the request 1024 to the Internet PDN gateway 1022 to update the security association with the security gateway 1006. The Internet PDN gateway 1022 forwards 1026 the request to the security gateway 1006. In some configurations, this request is sent using a multi-homing protocol, such as, but not limited to, MOBIKE protocol.

In response to receiving the request, at operation 1304, the security gateway 1006 updates a security association between the UE 1002 and the security gateway 1006. In some configurations, updating security configuration involves changing source IP addresses of the UE 1002, when a call handover takes place, such as call handover illustrated in FIG. 6B. Next, the security gateway 1006 sends a response 1028 informing the Internet PDN gateway 1022 that the security association update was successful. In turn, the Internet PDN gateway 1022 informs the UE 1002 that the SA update was successful by sending a response 1030. In some configurations, the response 1030 also uses the multi-homing protocol, such as, but not limited to, the MOBIKE protocol.

At operation 1306, in response to receiving the response indicating a successful SA update, the UE 1002 establishes a secure tunnel between the UE 1002 and the security gateway 1006, as described above in conjunction with the operation 1208 and FIG. 7.

Figure 9:
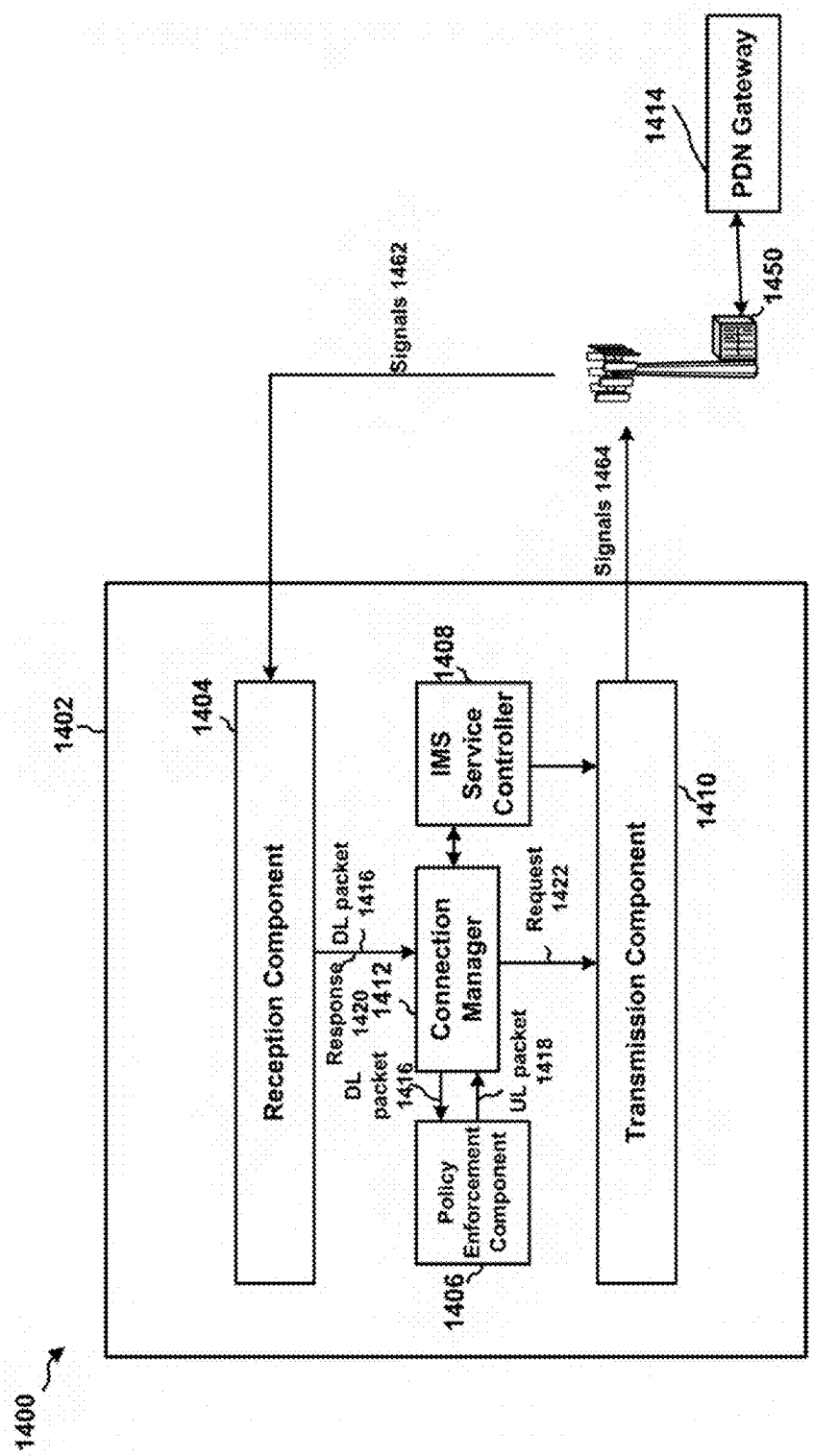
FIG. 9 is a diagram illustrating an example of a hardware implementation for an apparatus employing a processing system.

FIG. 9 is a conceptual data flow diagram 1400 illustrating the data flow between different components/means in an exemplary apparatus 1402. The apparatus 1402 may be a UE. The apparatus 1402 includes a reception component 1404, a policy enforcement component 1406, a connection manager 1412, an IMS service controller 1408 and a transmission component 1410. The reception component 1404 may receive signals 1462 from a base station 1450 and the transmission component 1410 may send signals 1464 to the base station 1450.

In certain configurations, the policy enforcement component 1406 is pre-configured to perform packet encryption and decryption as well as header generation on tunnel mode packets requiring security. It also passes or drops packets and may be configured to perform additional functionality such as Static NAT or fragmentation.

The policy enforcement component 1406 may be configured with security policies and security associations. The policy enforcement component 1406 may also contain keys for encrypting and decrypting DL data packets 1416 and UL data packets 1418, respectively.

In certain configurations, when handover of a call is necessary from a wireless access network to the PDN, the policy enforcement component 1406 may be configured to establish a secure tunnel with the PDN Gateway 1414 and may be configured to transmit encrypted UL packets 1418, such as IPsec tunnel mode packets, via the established secure tunnel.

Unlike standard IP packets or other types of IPsec packets (e.g., so-called transit mode packets), IPsec tunnel mode packets (such as packets 1126 shown in FIGS. 6A and 6B) have their full original IP packet header 1122a, as well as the payload 1122b, encapsulated and encrypted. This allows the source and destination address of the packet to be different from those of the encompassed packet which, in turn, permits the formation of a secure tunnel through which to route the tunnel mode packet. When a tunnel mode packet arrives at its destination it goes through an authentication check, including validation of the special IPsec tunnel mode headers, and authentication of the packet, such as by performing a cryptographic hash such as MD5 or SHA-1. Mismatched hash values are then used to identify the packet as either being damaged in transit or not having the proper key numbers. After the IPsec headers are validated, they are stripped off and the original IP packet is restored in the clear, including its original header with original source and destination addresses.

In certain configurations, the connection manager component 1412 is pre-configured to enable communication functionality with a cellular radio access network (2G, 3G, 4G, 5G, and the like). For example, the connection manager component 1412 may be configured to support a multi-homing protocol. In certain configurations, the multi-homing protocol is MOBIKE protocol. In other words, the connection manager component 1412 is pre-configured to perform a signaling procedure for acquiring/updating SAs by transmitting/receiving, for example, MOBIKE request 1422/response 1420 messages to/from the PDN gateway 1414 that is further operatively connected to a security gateway.

As noted above, in certain configurations, the connection manager component 1412 may also be pre-configured to enable communication functionality with a wireless access network. For example, the connection manager component is preconfigured to establish connection with the Wi-Fi access point 1112.

The connection manager component 1412 is also pre-configured to control handover between different wireless technologies based on various criteria. For example, if the signal strength of the connection to a wireless access network becomes weak or if the signal gets lost completely, this may result in the media session 801 being dropped, as shown in FIG. 3. Advantageously, the connection manager component 1412 is configured to perform a handover from the wireless access network (such as Wi-Fi network) to another cellular RAT to continue the IMS call.

IMS-based services are initiated and released using control plane signaling or data. Control plane signaling may be used to send data and/or to establish user plane signaling or data. In certain configurations, the apparatus 1402 may be a UE that is configured with more than one SIM and is capable of independently handling communications with multiple wireless access networks. The terms "SIM" and "SIM card" are used interchangeably herein to mean a memory that may be an integrated circuit or embedded into a removable card, which stores an International Mobile Subscriber Identity (IMSI), related key, and/or other information used to identify and/or authenticate a UE on a particular network.

In certain configurations, the IMS service controller 1408 is pre-configured to perform IMS service registration. Additionally, if the apparatus 1402 is a multi-SIM device, the IMS service controller 1402 is pre-configured to separately manage IMS service registration for each SIM. In various configurations each SIM may be capable of communicating with different RATs or the same RAT, depending on detected radio channel conditions.

Figure 10:
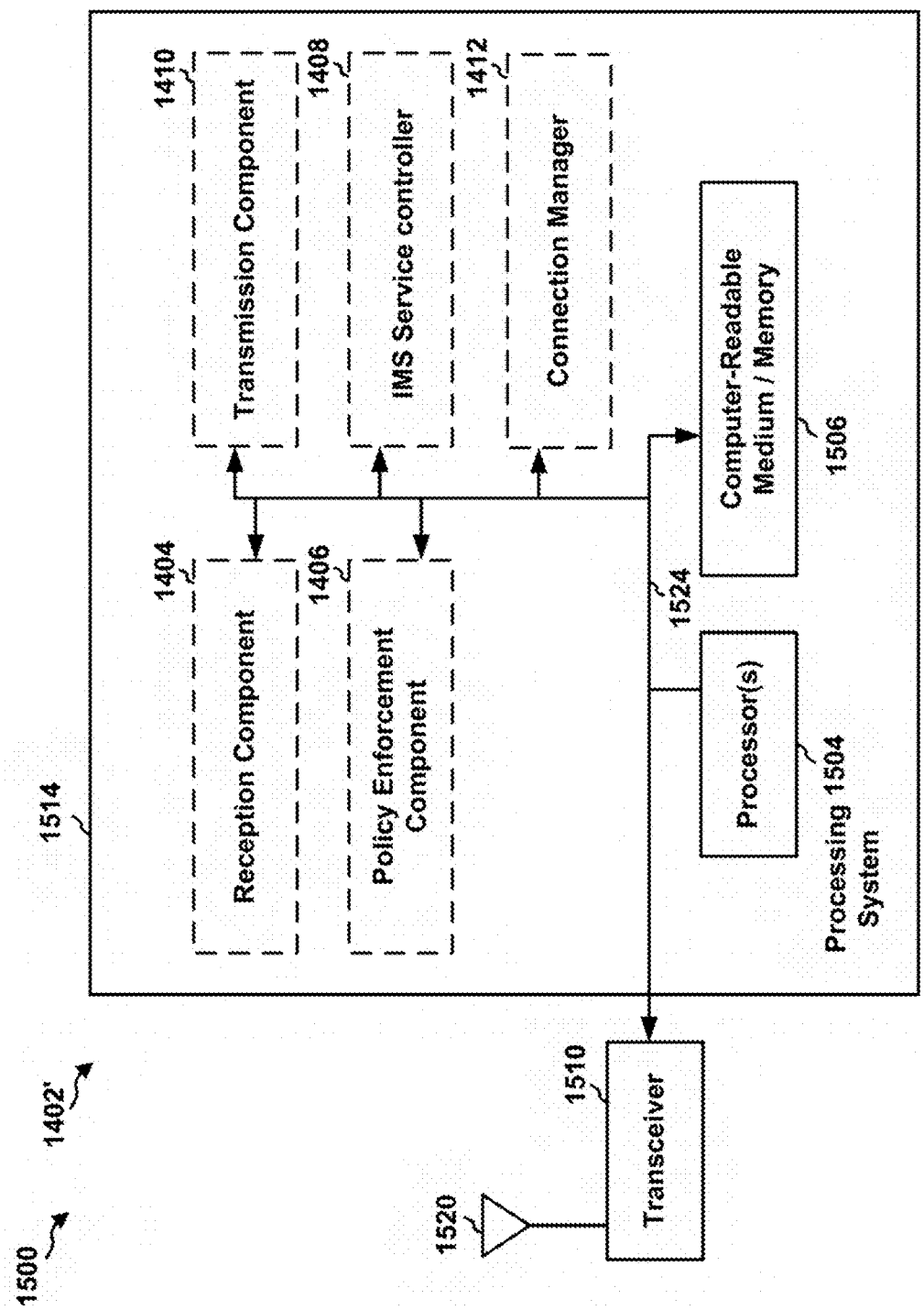
FIG. 10 is a diagram illustrating an example of a hardware implementation for an apparatus employing a processing system.

FIG. 10 is a diagram 1500 illustrating an example of a hardware implementation for an apparatus 1402' employing a processing system 1514. The apparatus 1402' may be a UE. The processing system 1514 may be implemented with a bus architecture, represented generally by a bus 1524. The bus 1524 may include any number of interconnecting buses and bridges depending on the specific application of the processing system 1514 and the overall design constraints. The bus 1524 links together various circuits including one or more processors and/or hardware components, represented by one or more processors 1504, the reception component 1404, the policy enforcement component 1406, the connection manager 1412, the IMS service controller 1408, the transmission component 1410, and a computer-readable medium/memory 1506. The bus 1524 may also link various other circuits such as timing sources, peripherals, voltage regulators, and power management circuits, etc.

The processing system 1514 may be coupled to a transceiver 1510, which may be one or more of the transceivers 354. The transceiver 1510 is coupled to one or more antennas 1520, which may be the communication antennas 352.

The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520.

The processing system 1514 includes one or more processors 1504 coupled to a computer-readable medium/ memory 1506. The one or more processors 1504 are responsible for general processing, including the execution of software stored on the computer-readable medium/memory 1506. The software, when executed by the one or more processors 1504, causes the processing system 1514 to perform the various functions described supra for any particular apparatus. The computer-readable medium/memory 1506 may also be used for storing data that is manipulated by the one or more processors 1504 when executing software. The processing system 1514 further includes at least one of the reception component 1404, the policy enforcement component 1406, the connection manager 1412, the IMS service controller 1408 and the transmission component 1410. The components may be software components running in the one or more processors 1504, resident/stored in the computer readable medium/memory 1506, one or more hardware components coupled to the one or more processors 1504, or some combination thereof. In one configuration, the processing system 1514 may be a component of the UE 350 and may include the memory 360 and/or at least one of the TX processor 368, the RX processor 356, and the communication processor 359.

In one configuration, the apparatus 1402/apparatus 1402' for wireless communication includes means for performing each of the operations of FIGS. 7-8. The aforementioned means may be one or more of the aforementioned components of the apparatus 1402 and/or the processing system 1514 of the apparatus 1402' configured to perform the functions recited by the aforementioned means.

As described supra, the processing system 1514 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE) comprising:
    establishing a connection with a base station on a cell of the base station;
    connecting, through the cell, to a packet data network (PDN) gateway to access a first PDN associated with a first Access Point Name (APN);
    communicating with a security gateway of a second PDN associated with a second APN via the first PDN;
    transferring, using a first source IP address, a secure tunnel between the UE and the security gateway of the second PDN from communicating over a wireless access network to communicating over the first PDN; and
    sending payload of an Internet Protocol (IP) Multimedia Subsystem (IMS) call from the UE to the second PDN through the PDN gateway, the first PDN, and the security gateway of the second PDN.

2. The method of claim 1, further comprising performing the Internet Protocol (IP) Multimedia Subsystem (IMS) call over the wireless access network by registering with an IMS server using a second source IP address prior to transferring the secure tunnel between the UE and the security gateway.

3. The method of claim 2, further comprising determining if communication with the wireless access network is lost and transferring the IMS call from the wireless access network to the PDN using the transferred secure tunnel between the UE and the security gateway, responsive to a determination that the communication with the wireless access network is lost.

4. The method of claim 2, wherein connecting to the security gateway via the PDN gateway further comprises sending a request to the security gateway using a multi-homing protocol.

5. The method of claim 4, wherein the multi-homing protocol comprises MOBIKE (Mobility and Multihoming) protocol.

6. The method of claim 4, further comprising updating, by the security gateway, a security association between the UE and the security gateway, in response to receiving the request from the PDN gateway.

7. The method of claim 6, wherein updating the security association further comprises changing source IP address of the UE from the second source IP address to the first source IP address.

8. The method of claim 6, wherein connecting to the security gateway via the PDN gateway further comprises receiving, by the UE, a response from the security gateway, the response indicating a successful security association update.

9. An apparatus for a wireless communication, the apparatus being a user equipment (UE), comprising:
 a processor and a memory device coupled to the processor, the memory device containing a set of instructions that, when executed by the processor, cause the processor to:
  establish a connection with a base station on a cell of the base station;
  connect through the cell, to a packet data network (PDN) gateway to access a first PDN associated with a first Access Point Name (APN);
  communicate with a security gateway of a second PDN associated with a second APN via the first PDN;
  transfer, using a first source IP address, a secure tunnel between the UE and the security gateway of the second PDN from communicating over a wireless access network to communicating over the first PDN; and
  send payload of an Internet Protocol (IP) Multimedia Subsystem (IMS) call from the UE to the second PDN through the PDN gateway, the first PDN, and the security gateway of the second PDN.

10. The apparatus of claim 9, wherein the set of instructions that, when executed by the processor, further cause the processor to perform the Internet Protocol (IP) Multimedia Subsystem (IMS) call over the wireless access network by registering with an IMS server using a second source IP address prior to transferring the secure tunnel between the UE and the security gateway.

11. The apparatus of claim 10, wherein the set of instructions that, when executed by the processor, further cause the processor to determine if communication with the wireless access network is lost and to transfer the IMS call from the wireless access network to the PDN using the transferred secure tunnel between the UE and the security gateway, responsive to a determination that the communication with the wireless access network is lost.

12. The apparatus of claim 10, wherein the set of instructions that, when executed by the processor, cause the processor to connect to the security gateway via the PDN gateway further cause the processor to send a request to the security gateway using a multi-homing protocol.

13. The apparatus of claim 12, wherein the multi-homing protocol comprises MOBIKE (Mobility and Multihoming) protocol.

14. The apparatus of claim 12, wherein the set of instructions that, when executed by the processor, further cause the processor to update, by the security gateway, a security association between the UE and the security gateway, in response to receiving the request from the PDN gateway.

15. The apparatus of claim 14, wherein the set of instructions that, when executed by the processor, cause the processor to update the security association further cause the processor to change source IP address of the UE from the second source IP address to the first source IP address.

16. The apparatus of claim 14, wherein the set of instructions that, when executed by the processor, cause the processor to connect to the security gateway via the PDN gateway further cause the processor to receive a response from the security gateway, the response indicating a successful security association update.

17. A tangible, non-transitory, computer-readable media having software encoded thereon, the software, when executed by a processor of a user equipment (UE), operable to:
 establish a connection with a base station on a cell of the base station;
 connect through the cell, to a packet data network (PDN) gateway to access a first PDN associated with a first Access Point Name (APN);
 communicate with a security gateway of a second PDN associated with a second APN via the first PDN;
 transfer, using a first source IP address, a secure tunnel between the UE and the security gateway of the second PDN from communicating over a wireless access network to communicating over the first PDN; and
 send payload of an Internet Protocol (IP) Multimedia Subsystem (IMS) call from the UE to the second PDN through the PDN gateway, the first PDN, and the security gateway of the second PDN.

18. The computer-readable media of claim 17, wherein the software, when executed by the processor, further cause the processor to perform the Internet Protocol (IP) Multimedia Subsystem (IMS) call over the wireless access network by registering with an IMS server using a second source IP address prior to transferring the secure tunnel between the UE and the security gateway.

19. The computer-readable media of claim 18, wherein the software, when executed by the processor, further cause the processor to determine if communication with the wireless access network is lost and to transfer the IMS call from the wireless access network to the PDN using the transferred secure tunnel between the UE and the security gateway, responsive to a determination that the communication with the wireless access network is lost.

20. The computer-readable media of claim 18, wherein the set of instructions that, when executed by the software, cause the processor to connect to the security gateway via the PDN gateway further cause the processor to send a request to the security gateway using a multi-homing protocol.

* * * * *